(12) United States Patent
Kimura et al.

(10) Patent No.: US 10,386,092 B2
(45) Date of Patent: Aug. 20, 2019

(54) WATER HEATER

(71) Applicant: NORITZ CORPORATION, Hyogo (JP)

(72) Inventors: Sakiko Kimura, Himeji (JP); Takeshi Oohigashi, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 385 days.

(21) Appl. No.: 14/732,478

(22) Filed: Jun. 5, 2015

(65) Prior Publication Data
US 2016/0010892 A1    Jan. 14, 2016

(30) Foreign Application Priority Data

Jul. 8, 2014   (JP) .................. 2014-140258

(51) Int. Cl.
| F24H 9/20 | (2006.01) |
| F24H 1/14 | (2006.01) |
| F24H 8/00 | (2006.01) |
| F24H 9/18 | (2006.01) |

(52) U.S. Cl.
CPC .......... *F24H 9/2042* (2013.01); *F24H 1/145* (2013.01); *F24H 8/00* (2013.01); *F24H 8/006* (2013.01); *F24H 9/1836* (2013.01); *Y02B 30/102* (2013.01); *Y02B 30/106* (2013.01)

(58) Field of Classification Search
USPC ..................................................... 122/14.21
See application file for complete search history.

(56) References Cited

U.S. PATENT DOCUMENTS

2012/0037096 A1*  2/2012  Watanabe .............. F23L 11/02
                                                      122/14.21

FOREIGN PATENT DOCUMENTS

| JP | S60-186617 A  | 9/1985 |
| JP | H06-035897 B2 | 5/1994 |
| JP | 2008-298367 A | 12/2008 |
| JP |    588094   * | 1/2013 |
| JP | 2013-160453 A | 8/2013 |

OTHER PUBLICATIONS

An Office Action issued by the Japanese Patent Office dated Oct. 27, 2015, which corresponds to Japanese Patent Application No. 2014-140258 and is related to U.S. Appl. No. 14/732,478; with English language partial translation.

* cited by examiner

*Primary Examiner* — Steven B McAllister
*Assistant Examiner* — John E Bargero
(74) *Attorney, Agent, or Firm* — Studebaker & Brackett PC

(57) ABSTRACT

A water heater includes: a burner; a heat exchanger; a fan for supplying air to the burner and emitting combustion gas having passed through the heat exchanger to outside of the water heater; and a drainage water discharge path connected to the heat exchanger. The drainage water discharge path has a water-sealing structure that is water-sealed by drainage water. The water heater further includes a control unit: having a water-seal determination unit giving permission that the water heater can operate in a normal mode based on a condition that the drainage water discharge path has been water-sealed; and issuing an instruction to cause the burner to intermittently operate for a time period until the water-seal determination unit gives the permission.

19 Claims, 10 Drawing Sheets

WATER HEATER

BACKGROUND OF THE INVENTION

Field of the Invention

The present invention relates to a water heater and particularly to a water heater of a latent heat recovery type capable of heating water by recovering latent heat of combustion gas.

Description of the Background Art

In addition to a primary heat exchanger for mainly recovering sensible heat of combustion gas, a water heater of a latent heat recovery type includes a secondary heat exchanger for mainly recovering latent heat. This water heater of a latent heat recovery type can obtain condensation heat (latent heat) by condensing water vapor contained in combustion gas, so that it can achieve relatively high thermal conversion efficiency.

According to such a water heater of a latent heat recovery type, condensation of water vapor occurs in combustion gas within the secondary heat exchanger, thereby producing drainage water (dew condensation water). At this time, combustion gas contains nitrogen oxides generated by reaction between nitrogen and oxygen in the air due to combustion, sulfur oxides generated by reaction between oxygen and the sulfur content in the fuel due to combustion, and the like. Accordingly, the produced drainage water is strongly acid due to these nitrogen oxides and sulfur oxides.

The drainage water produced in the secondary heat exchanger is generally neutralized in a neutralizer disposed in a drainage water discharge path, and then, discharged through the drainage water discharge path to the outside. The water heater provided with such a drainage water discharge path has a configuration in which a combustion gas flow path and a drainage water discharge path communicate with each other.

Accordingly, in the case where a water heater of a forced exhaust type serving to force the outside air inside by a fan to thereby emit combustion gas to the outside is disposed inside the building, positive pressure occurs in the secondary heat exchanger. This may cause a problem that combustion gas that should originally be emitted to the outside of the building through an exhaust pipe (a B vent) is emitted through the drainage water discharge path to the inside of the building in which a water heater is arranged.

Furthermore, for example, in the case of a water heater of a latent heat recovery type using an exhaust suction system as disclosed in Japanese Patent Laying-Open No. 60-186617 and Japanese Patent Publication No. 06-35897, since a fan is arranged downstream of the secondary heat exchanger, negative pressure occurs in the secondary heat exchanger due to suction pressure of the fan, which causes the outside air to flow through the drainage water discharge path back into the secondary heat exchanger. Consequently, it may become difficult to cause the drainage water to be discharged from the secondary heat exchanger.

Thus, in such a water heater, for example, a plurality of chambers are provided within a drainage water tank disposed in the drainage water discharge path, and holes allowing communication between these chambers are filled with drainage water and thereby water-sealed, so as to solve the above-described problem. Such a water-sealing structure of the drainage water discharge path in the water heater of a latent heat recovery type is disclosed, for example, in Japanese Patent Laying-Open No. 2008-298367 and Japanese Patent Laying-Open No. 2013-160453.

However, even in the case of the water heater provided with a drainage water discharge path having a water-sealing mechanism, when performing a trial operation of a new water heater, or when resuming an operation of a water heater that has not been used for a long period of time or resuming an operation of a water heater or the like from which drainage water is removed for maintenance or freeze proofing, there occur problems that combustion gas in the water heater of a latent heat recovery type using a forced exhaust system described above flows into the building and the drainage water is difficult to be discharged from the secondary heat exchanger in the water heater of a latent heat recovery type using an exhaust suction system, for a time period from start of the operation until the drainage water discharge path is water-sealed.

SUMMARY OF THE INVENTION

The present invention has been made in light of the above-described problems. An object of the present invention is to provide a water heater of a latent heat recovery type that: includes a drainage water discharge path having a water-sealing mechanism; and prevents occurrence of problems that combustion gas flows into the building and drainage water is difficult to be discharged from the secondary heat exchanger even for a time period until the drainage water discharge path is water-sealed.

A water heater according to the present invention is a water heater of a latent heat recovery type capable of heating water by recovering latent heat of combustion gas, and includes: a burner generating combustion gas by burning fuel gas in a combustion region; a heat exchanger heating water flowing through inside by heat exchange with combustion gas generated in the burner; a fan for supplying air to the burner; and a drainage water discharge path connected to the heat exchanger for discharging drainage water to outside of the heat exchanger, drainage water being produced by recovering latent heat in the heat exchanger. The drainage water discharge path has a water-sealing structure that is water-sealed by drainage water. The fan for supplying air to the burner is represented by a concept including a type of a fan serving to suction air to thereby supply air to the burner and a type of a fan serving to force air inside to thereby supply air to the burner.

Furthermore, the water heater of the present invention includes a control unit: including a water-seal determination unit giving permission that the water heater can operate in a normal mode based on a condition that the drainage water discharge path has been water-sealed; and issuing an instruction to cause the burner to intermittently operate for a time period until the water-seal determination unit gives the permission. In this way, by causing the burner to intermittently operate for a time period until the drainage water discharge path is water-sealed, it becomes possible to prevent occurrence of problems that combustion gas flows into the building and drainage water is difficult to be discharged from the secondary heat exchanger.

It is preferable that, in the burner, the combustion region is formed of a plurality of unit regions that can be independently controlled such that a generation amount of combustion gas can be changed in accordance with a required hot-water supply capability, and also that the control unit issues an instruction to the burner to cause combustion to occur in all of the unit regions for a time period until the water-seal determination unit gives the permission. In this way, since the produced amount of the drainage water is maximized by maintaining the combustion state achieved by all of the combustion pipes, the drainage water discharge path can be water-sealed promptly. In other words, even in the case where the water-sealed drainage water discharge path is unsealed, a desired hot-water supply capability can be achieved immediately as in the usual case.

It is preferable that the burner is configured to be capable of adjusting a supply amount of fuel gas to the combustion region, and the control unit issues an instruction to the burner to maximize the supply amount of fuel gas for a time period until the water-seal determination unit gives the permission. In this way, since the produced amount of the drainage water is maximized by maintaining the combustion state at the maximum capability, the drainage water discharge path can be water-sealed promptly. In other words, even in the case where the water-sealed drainage water discharge path is unsealed, a desired hot-water supply capability can be achieved immediately as in the usual case.

It is preferable that the water-seal determination unit gives the permission on a condition that an estimate drainage water discharge amount becomes equal to or greater than a prescribed threshold value. The estimate drainage water discharge amount is calculated using at least one selected from a group consisting of the supply amount of fuel gas to the combustion region, a temperature of water supplied to the water heater, and a temperature of hot water discharged from the water heater. This allows the water-seal determination unit to automatically make a permission determination.

It is preferable that: the fan is configured to be arranged downstream of the heat exchanger in a flow direction of combustion gas to suction air into the burner; the water heater further comprises an exhaust temperature detection unit measuring a temperature of combustion gas and provided downstream of the heat exchanger in the flow direction of combustion gas; and the water-seal determination unit gives the permission on a condition that the temperature of combustion gas measured in the exhaust temperature detection unit tends to increase to a value equal to or greater than a prescribed threshold value. In such a water heater of an exhaust suction type, the burner is caused to intermittently operate for a time period until the drainage water discharge path is water-sealed. Thereby, it becomes possible to prevent occurrence of a problem that drainage water is difficult to be discharged from the secondary heat exchanger, and also becomes possible to allow the water-seal determination unit to automatically make a permission determination.

The fan may be configured to be arranged upstream of the heat exchanger in a flow direction of combustion gas to force air into the burner. In this case, the burner is caused to intermittently operate for a time period until the drainage water discharge path is water-sealed, so that it becomes possible to prevent occurrence of a problem that combustion gas is discharged to the outside (for example, into the building).

As described above, according to the present invention, a water heater of a latent heat recovery type can be provided that: includes a drainage water discharge path having a water-sealing mechanism; and also prevents occurrence of problems that combustion gas flows into the building and drainage water is difficult to be discharged from the secondary heat exchanger even for a time period until the drainage water discharge path is water-sealed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
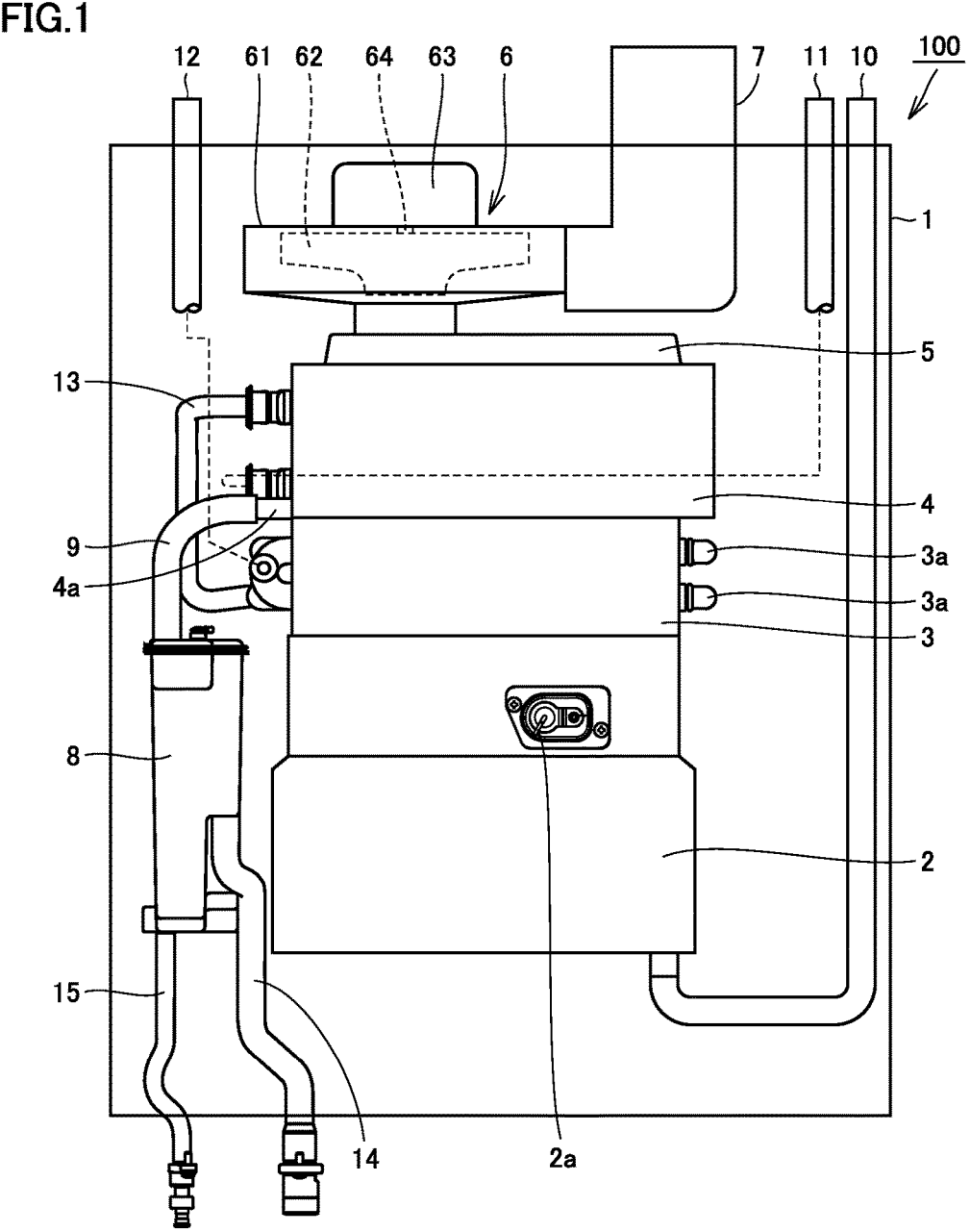
FIG. 1 is a front view schematically showing the configuration of a water heater in the first embodiment.

Embodiments of the present invention will be hereinafter described with reference to the drawings. In the accompanying drawings, the same or corresponding components are designated by the same reference characters. Furthermore, the dimensional relation such as length, width, thickness, and depth is modified as appropriate for the purpose of clarifying and simplifying each figure, and is not to actual scale.

<First Embodiment>

The configuration of a water heater in the first embodiment of the present invention will be hereinafter described with reference to FIGS. 1, 2, and 4 to 10.

Figure 2:
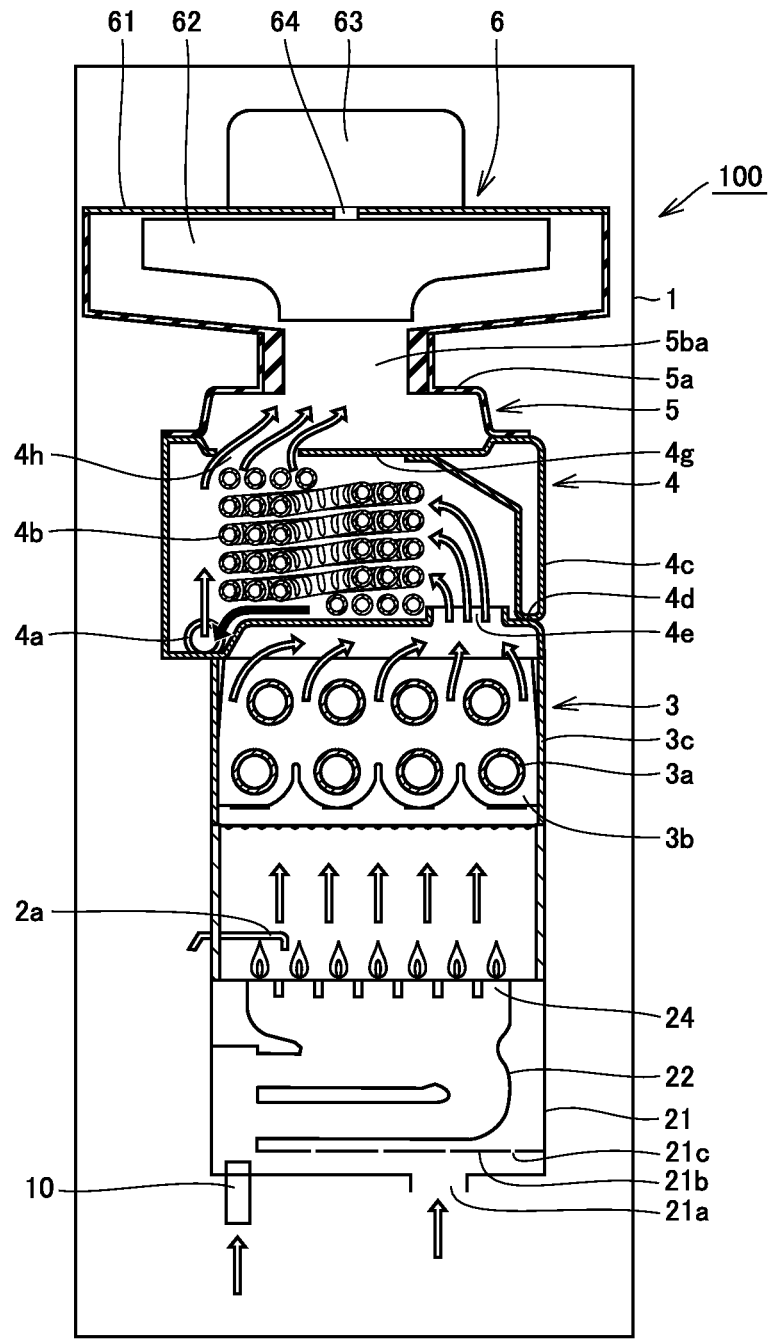
FIG. 2 is a partial cross-sectional side view schematically showing the configuration of the water heater shown in FIG. 1.
Figure 3:
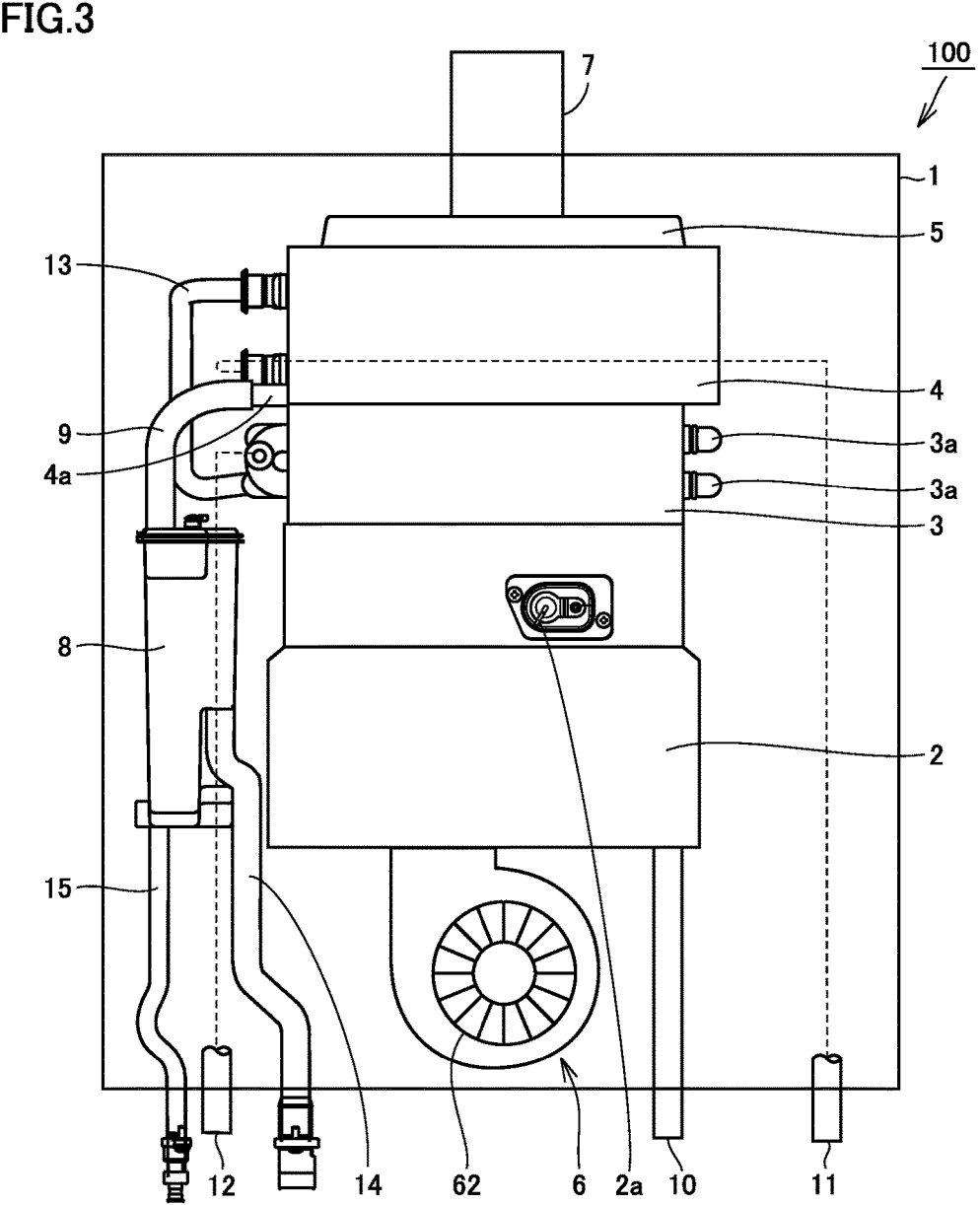
FIG. 3 is a front view schematically showing the configuration of a water heater in the second embodiment.

Referring mainly to FIGS. 1 and 2, a water heater 100 of the present embodiment serves as a water heater of a latent heat recovery type using an exhaust suction and combustion system. This water heater 100 mainly includes a housing 1, a burner 2, a primary heat exchanger 3, a secondary heat exchanger 4, an exhaust box 5, a fan 6, an exhaust tube (a flexible exhaust tube) 7, a drainage water tank 8, and pipes 9 to 15. In addition, since water heater 100 of the present embodiment is of an exhaust suction and combustion type, burner 2, primary heat exchanger 3, secondary heat exchanger 4, and fan 6 are arranged in this order from upstream to downstream in the flow of combustion gas.

(Burner)

Referring mainly to FIGS. 1 and 2, burner 2 serves to produce combustion gas by burning fuel gas, and includes a combustion pipe 22 having a plurality of burner port portions 24. A gas supply pipe 10 is connected to combustion pipe 22. This gas supply pipe 10 serves to supply fuel gas to combustion pipe 22. For example, an electromagnetic valve and a proportional valve (not shown) are attached to this gas supply pipe 10. Furthermore, burner 2 is also supplied with air from an opening 21a at the bottom of a burner case 21 that houses combustion pipe 22.

A spark plug 2a is arranged above combustion pipe 22. This spark plug 2a serves to ignite an air fuel mixture injected from burner port portions 24 of combustion pipe 22 to thereby produce a flame, by generating sparks between the plug and a target (not shown) provided in combustion pipe 22 by operating an ignition device (an igniter). Burner 2 generates a quantity of heat by burning fuel gas supplied from gas supply pipe 10 (which is called a combustion operation).

Figure 5:
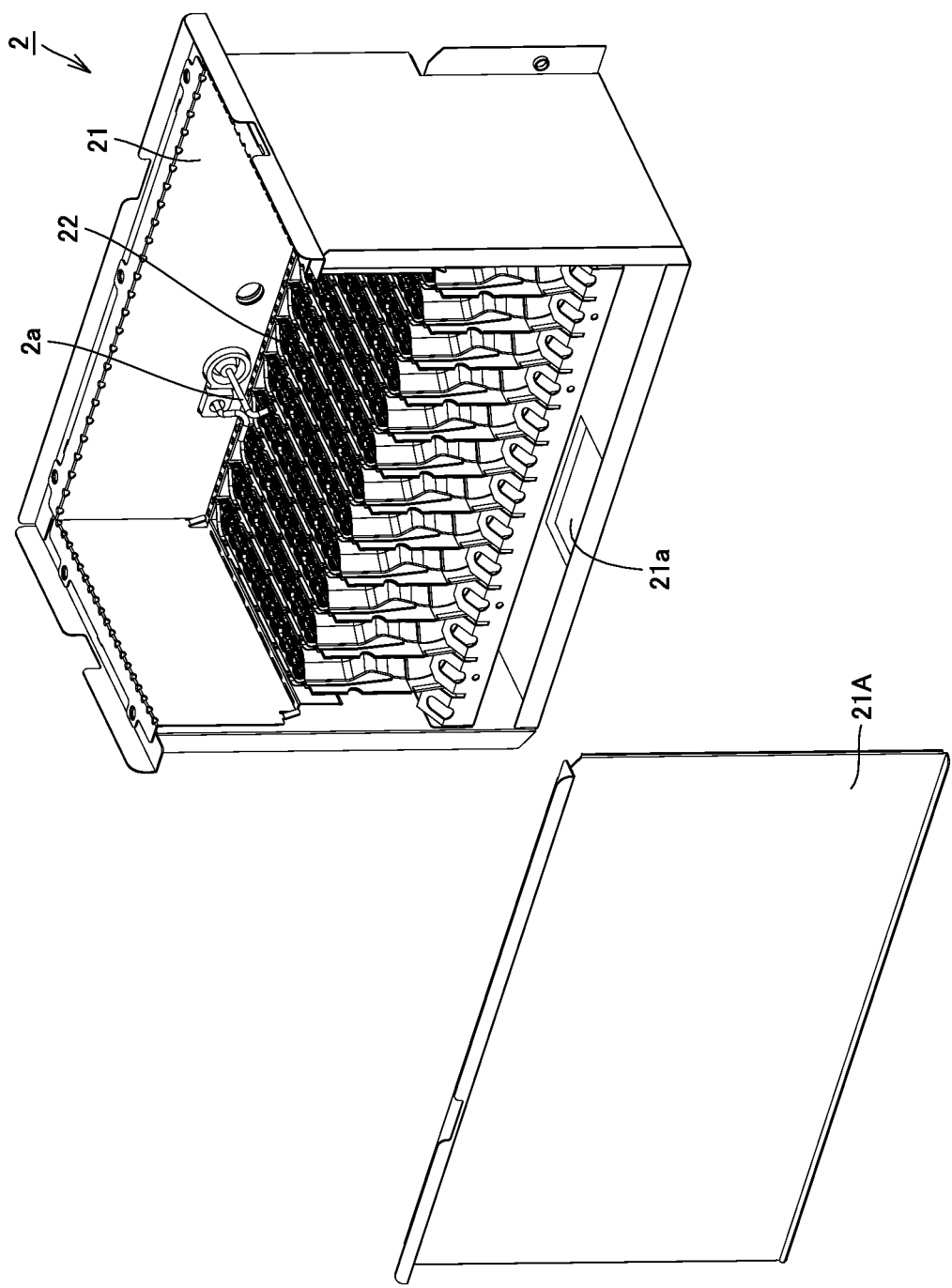
FIG. 5 is a perspective view schematically showing the configuration of a burner in the first embodiment, which is an exploded perspective view showing the state where a wall surface of a burner case is removed.
Figure 6:
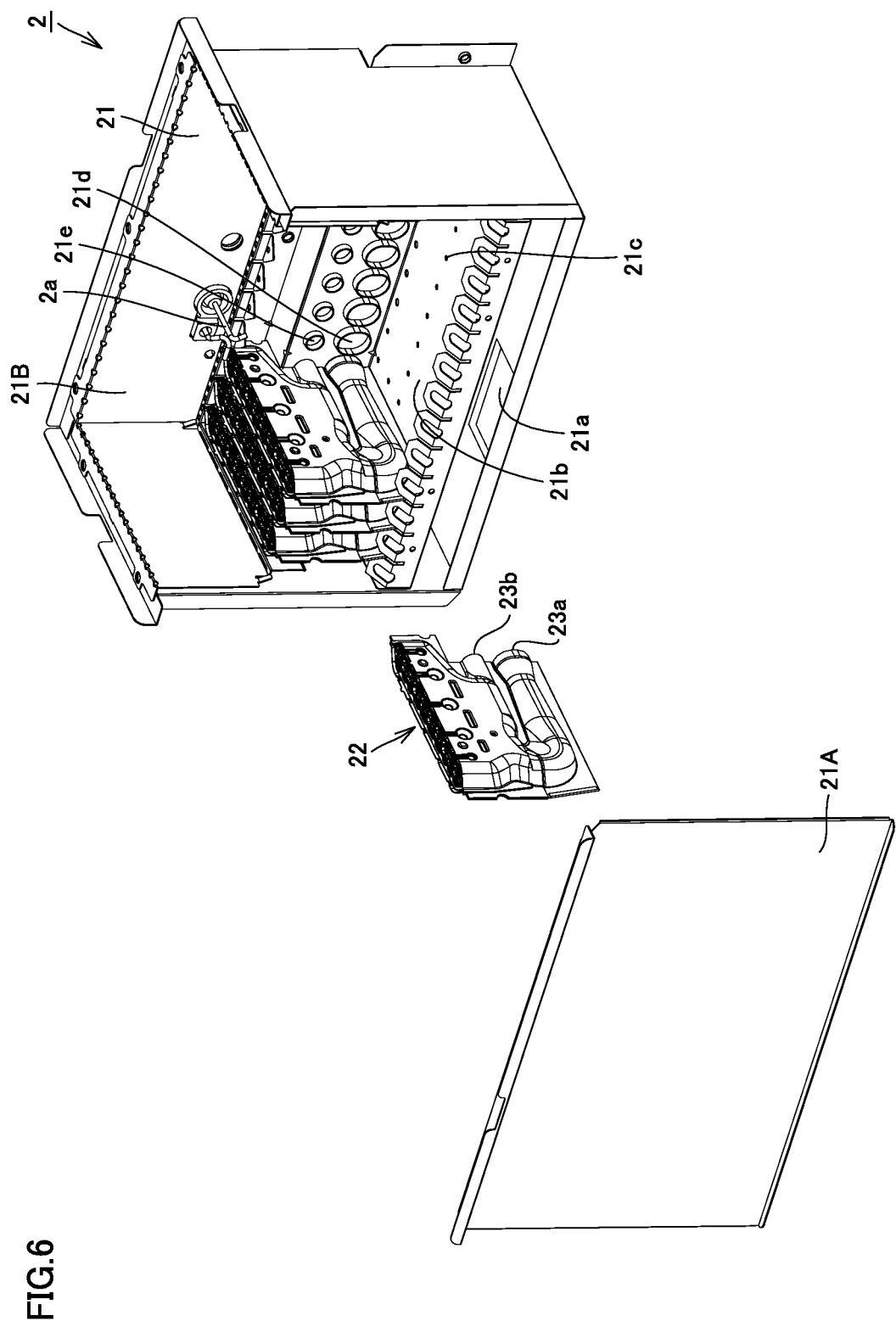
FIG. 6 is an exploded perspective view showing the state where one of combustion pipes is further removed from the state shown in the exploded perspective view in FIG. 5.

Referring mainly to FIGS. 5 and 6, burner 2 mainly has a burner case 21, a plurality of combustion pipes 22, and spark plug 2a.

Burner case 21 has a bottom plate provided with opening 21a through which air is introduced. Furthermore, burner case 21 has a partition plate 21b for partitioning the space into a passage of air flowing thereinto through opening 21a and a storage unit of combustion pipes 22. Partition plate 21b is provided with a plurality of through holes 21c, which allow communication between the passage of air flowing into burner case 21 through opening 21a and the storage unit of the plurality of combustion pipes 22.

Each of the plurality of combustion pipes 22 is supported by partition plate 21b and housed within burner case 21. Each of the plurality of combustion pipes 22 has gas inlet ports 23a and 23b that are connected to openings 21d and 21e, respectively, provided in the wall surface of burner case 21 (FIG. 6).

Spark plug 2a attached to a wall surface 21B of burner case 21 is disposed above the plurality of combustion pipes 22.

Figure 7:
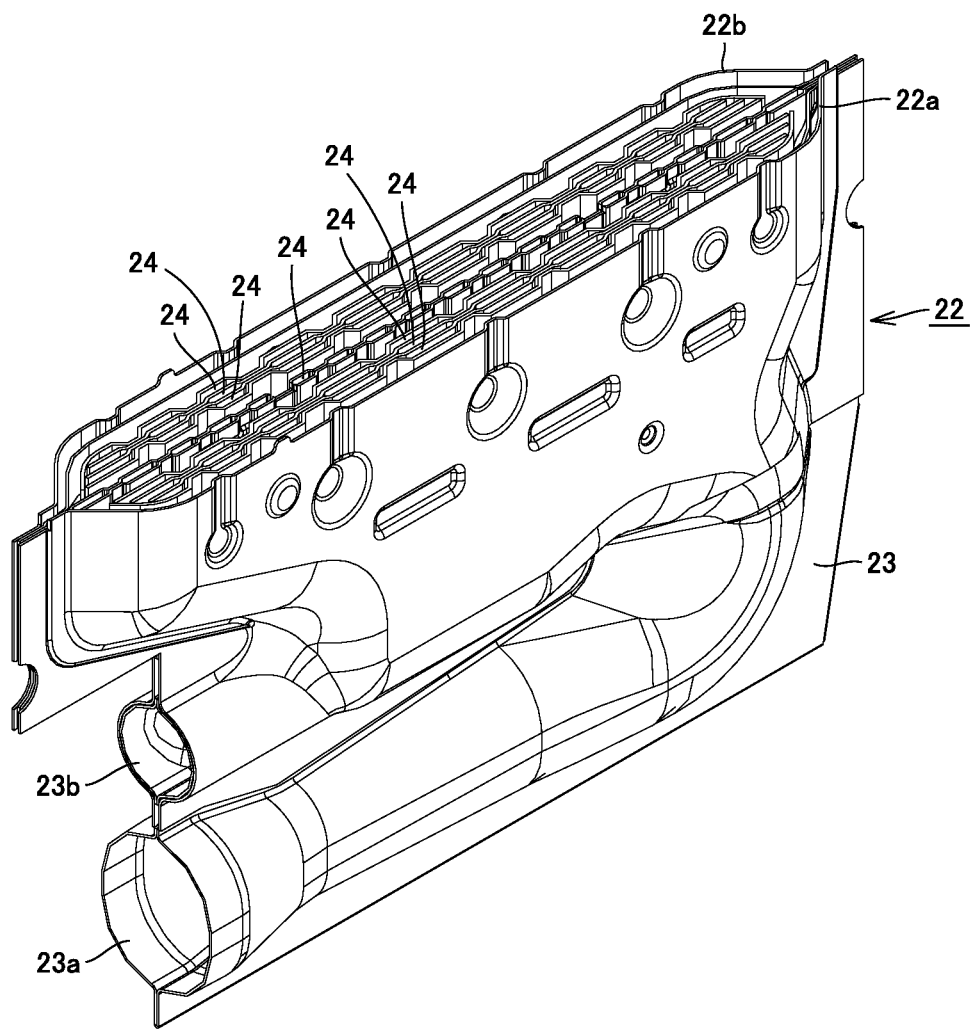
FIG. 7 is a perspective view schematically showing an example of the configuration of a combustion pipe in the first embodiment.

Referring mainly to FIG. 7, each combustion pipe 22 mainly has a main body unit 23, a pair of burner units 22a and 22b disposed on the right and left sides, and a burner port portion 24. Main body unit 23 is provided with gas inlet ports 23a and 23b. Burner units 22a and 22b defined as one pair are attached to the right side and the left side, respectively, of main body unit 23. Burner port portion 24 is provided inside between burner units 22a and 22b.

Referring mainly to FIGS. 2 and 6, in this water heater 100, air around water heater 100 is introduced into burner case 21 through opening 21a provided in the bottom plate of burner case 21. Part of the air flowing into burner case 21 is mixed with fuel gas as primary air from each of gas inlet ports 23a and 23b of each of the plurality of combustion pipes 22 arranged within burner case 21, and then, supplied into each combustion pipe 22 as an air-fuel mixture. Also, the remaining portion of the air flowing into burner case 21 is supplied as secondary air into the storage unit of combustion pipes 22 from a through hole 21c provided in partition plate 21b partitioning the space into the air passage and the storage unit of combustion pipes 22.

In addition, burner port portion 24 of combustion pipe 22 corresponds to a combustion region within burner case 21. The combustion region is formed of a plurality of unit regions that can be independently controlled such that the generation amount of combustion gas can be changed in accordance with the required hot-water supply capability. For example, a different number of combustion pipes 22 are housed in each unit region. A plurality of electromagnetic valves provided in each unit region are independently controlled to be separately opened or closed, so that the number of combustion pipes 22 (the number of stages of the water heater) used for combustion can be adjusted. Furthermore, the amount of fuel gas to be supplied to combustion pipe 22 can be adjusted in a stepless manner by the proportional valve provided in gas supply pipe 10 so as to fall within a range of the rated amount.

(Primary Heat Exchanger)

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, serves to heat water which flows through heat conduction pipe 3a of primary heat exchanger 3 with the quantity of heat generated as a result of the combustion operation of burner 2.

(Secondary Heat Exchanger)

Referring mainly to FIG. 2, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 100 according to the present embodiment thus has secondary heat exchanger 4 of a latent heat recovery type, it serves as a water heater of a latent heat recovery type.

Secondary heat exchanger 4 mainly has a drainage water discharge port 4a, a heat conduction pipe 4b, a sidewall 4c, a bottom wall 4d, and an upper wall 4g. Heat conduction pipe 4b is layered as it is spirally wound. Sidewall 4c, bottom wall 4d, and upper wall 4g are arranged to surround heat conduction pipe 4b.

In secondary heat exchanger 4, water flowing through heat conduction pipe 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, thereby producing drainage water.

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipe 4b of secondary heat exchanger 4 is arranged.

As shown with hollow arrows in FIG. 2, combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Furthermore, upper wall 4g is provided with an opening 4h. This opening 4h allows communication between the space where heat conduction pipe 4b of secondary heat exchanger 4 is arranged and an internal space in exhaust box 5. As shown with hollow arrows in FIG. 2, combustion gas can flow from secondary heat exchanger 4 into the internal space of exhaust box 53 through opening 4h.

Drainage water discharge port 4a is provided in sidewall 4c or bottom wall 4d. This drainage water discharge port 4a opens at a lowest position in the space surrounded by side wall 4c, bottom wall 4d and upper wall 4g (at a lowermost position in a vertical direction in the state where the water heater is placed), which is lower than the lowermost end of heat conduction pipe 4b. Thus, drainage water produced in secondary heat exchanger 4 can be guided to drainage water discharge port 4a along bottom wall 4d and sidewall 4c as shown with black arrows in FIG. 2.

(Exhaust Box)

Referring mainly to FIG. 2, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. The internal space of box main body 5a communicates through opening 4h of secondary heat exchanger 4 with the internal space in which heat conduction pipe 4b of secondary heat exchanger 4 is disposed. Fan connection portion 5b is provided so as to protrude from the upper portion of box main body 5a. This fan connection portion 5b has a cylindrical shape, for example, and has an internal space 5ba that communicates with the internal space of box main body 5a.

(Fan)

Referring mainly to FIGS. 1 and 2, fan 6 mainly has a fan case 61, an impeller 62, a drive source 63, and a rotation shaft 64. Drive source 63 is provided outside fan case 61, and rotation shaft 64 couples impeller 62 housed within fan case 61 and drive source 63 provided outside fan case 61. Thereby, impeller 62 receives driving force from drive source 63 so that it can rotate around rotation shaft 64.

Fan 6 is configured to be arranged downstream of the heat exchanger (the primary heat exchanger and the secondary heat exchanger) in the flow direction of combustion gas to suction air into burner 2. Fan 6 is connected to exhaust tube 7 leading to the outside of water heater 100 in order to emit combustion gas (of which heat has been exchanged in secondary heat exchanger 4) which has passed through secondary heat exchanger 4 to the outside of water heater 100 by suctioning combustion gas. Exhaust tube 7 is disposed outside water heater 100 and connected to the outer circumferential side of fan case 61. Accordingly, combustion gas emitted to the outer circumferential side of impeller 62 can be emitted to the outside of water heater 100 through exhaust tube 7.

In this way, fan 6 is located downstream of exhaust box 5 and secondary heat exchanger 4 in the flow of combustion gas. Namely, in water heater 100, burner 2, primary heat exchanger 3, secondary heat exchanger 4, exhaust box 5, and fan 6 are arranged in this order from upstream to downstream in the flow of combustion gas produced in burner 2. Since combustion gas is suctioned and exhausted by means of fan 6 as above in this arrangement, water heater 100 in the present embodiment is a water heater of an exhaust suction and combustion type.

(Drainage Water Discharge Path)

Figure 4:
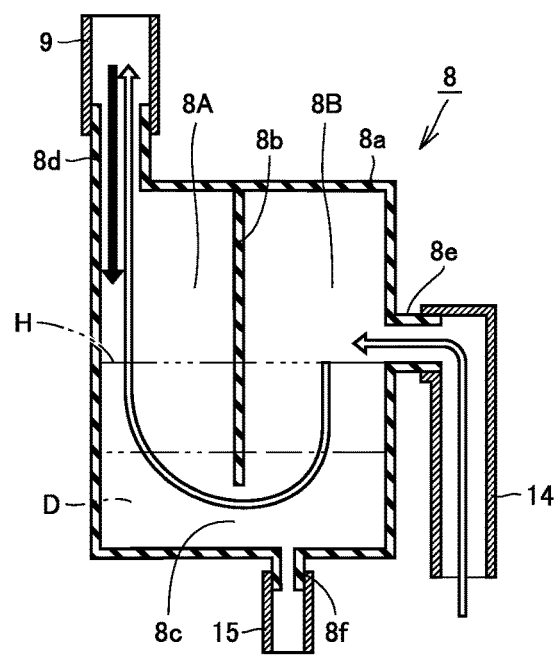
FIG. 4 is a cross-sectional view schematically showing the configuration of a drainage water tank in the first embodiment.

Referring mainly to FIGS. 1 and 4, the drainage water discharge path in the water heater of the present embodiment is formed of a drainage water discharge port 4a, a pipe 9, a drainage water tank 8, and a drainage water discharge pipe 14. Drainage water tank 8 serves to store drainage water produced in secondary heat exchanger 4. This drainage water tank 8 mainly has a drainage water storage portion 8a, a wall portion 8b, a drainage water introducing portion 8d, a drainage water discharge portion 8e, and a drainage water outlet port 8f.

The internal space of drainage water storage portion 8a is partitioned by wall portion 8b into a space 8A and a space 8B. Space 8A and space 8B, which are partitioned by wall portion 8b, communicate with each other through a hole 8c provided below wall portion 8b. Drainage water introducing portion 8d is provided above drainage water storage portion 8a so as to lead to space 8A while drainage water discharge portion 8e is provided at a prescribed height position in drainage water storage portion 8a so as to lead to space 8B.

Drainage water discharge port 4a of secondary heat exchanger 4 and drainage water introducing portion 8d of drainage water tank 8 (FIG. 4) are connected through pipe 9 in order to discharge the drainage water within secondary heat exchanger 4 to the outside. Furthermore, drainage water discharge pipe 14 is connected to drainage water discharge portion 8e of drainage water tank 8 (FIG. 4), and leads to the outside of water heater 100 (FIG. 1). The acid drainage water stored in drainage water tank 8 is temporarily stored in the internal space of drainage water tank 8, and then, usually discharged through drainage water discharge pipe 14 to the outside of water heater 100.

This drainage water tank 8 has a water-sealing structure. In other words, drainage water tank 8 is configured in such a manner that the outside air (air on the outside of water heater 100) having flowing into drainage water tank 8 through drainage water discharge portion 8e is prevented from flowing toward drainage water introducing portion 8d when the level of the drainage water stored in the lower portion of each of space 8A and space 8B exceeds the upper edge of hole 8c as shown by a chain double-dashed line in the figure. By this water-sealing structure of drainage water tank 8, the outside air is prevented from leaking from drainage water tank 8 and flowing into water heater 100, as shown by hollow arrows in the figure.

In addition, drainage water tank 8 (space 8B) is provided at its lower portion with drainage water outlet port 8f (FIG. 4). Drainage water outlet pipe 15 is connected to this drainage water outlet port 8f and leads to the outside of water heater 100 (FIG. 1). This drainage water outlet pipe 15 (usually closed) is designed to be opened for maintenance, freeze proofing or the like, thereby allowing discharge of drainage water within drainage water tank 8 that cannot be discharged through drainage water discharge pipe 14. An internal space in drainage water tank 8 may be filled with a neutralization agent (not shown) for neutralizing acid drainage water.

(Pipe)

Referring mainly to FIGS. 1 and 2, a water supply pipe 11 is connected to one end of heat conduction pipe 4b of secondary heat exchanger 4, and a hot water delivery pipe 12 is connected to one end of heat conduction pipe 3a of primary heat exchanger 3. Furthermore, the other end of heat conduction pipe 3a of primary heat exchanger 3 and the other end of heat conduction pipe 4b of secondary heat exchanger 4 are connected to each other through a connection pipe 13. Each of gas supply pipe 10, water supply pipe 11, and hot water delivery pipe 12 described above leads to the outside, for example, in a top portion of water heater 100. Furthermore, burner 2, primary heat exchanger 3, secondary heat exchanger 4, exhaust box 5, fan 6, drainage water tank 8, and the like are arranged inside housing 1.

Referring mainly to FIG. 1, gas supply pipe 10 is connected to burner 2. Water supply pipe 11 is connected to heat conduction pipe 4b of secondary heat exchanger 4 (see FIG.

2) and hot water delivery pipe 12 is connected to heat conduction pipe 3a of primary heat exchanger 3 (see FIG. 2). Heat conduction pipe 3a of primary heat exchanger 3 and heat conduction pipe 4b of secondary heat exchanger 4 are connected to each other through connection pipe 13. Each of gas supply pipe 10, water supply pipe 11, and hot water delivery pipe 12 described above leads to the outside, for example, in a top portion of water heater 100.

(Control Unit)

Figure 8:
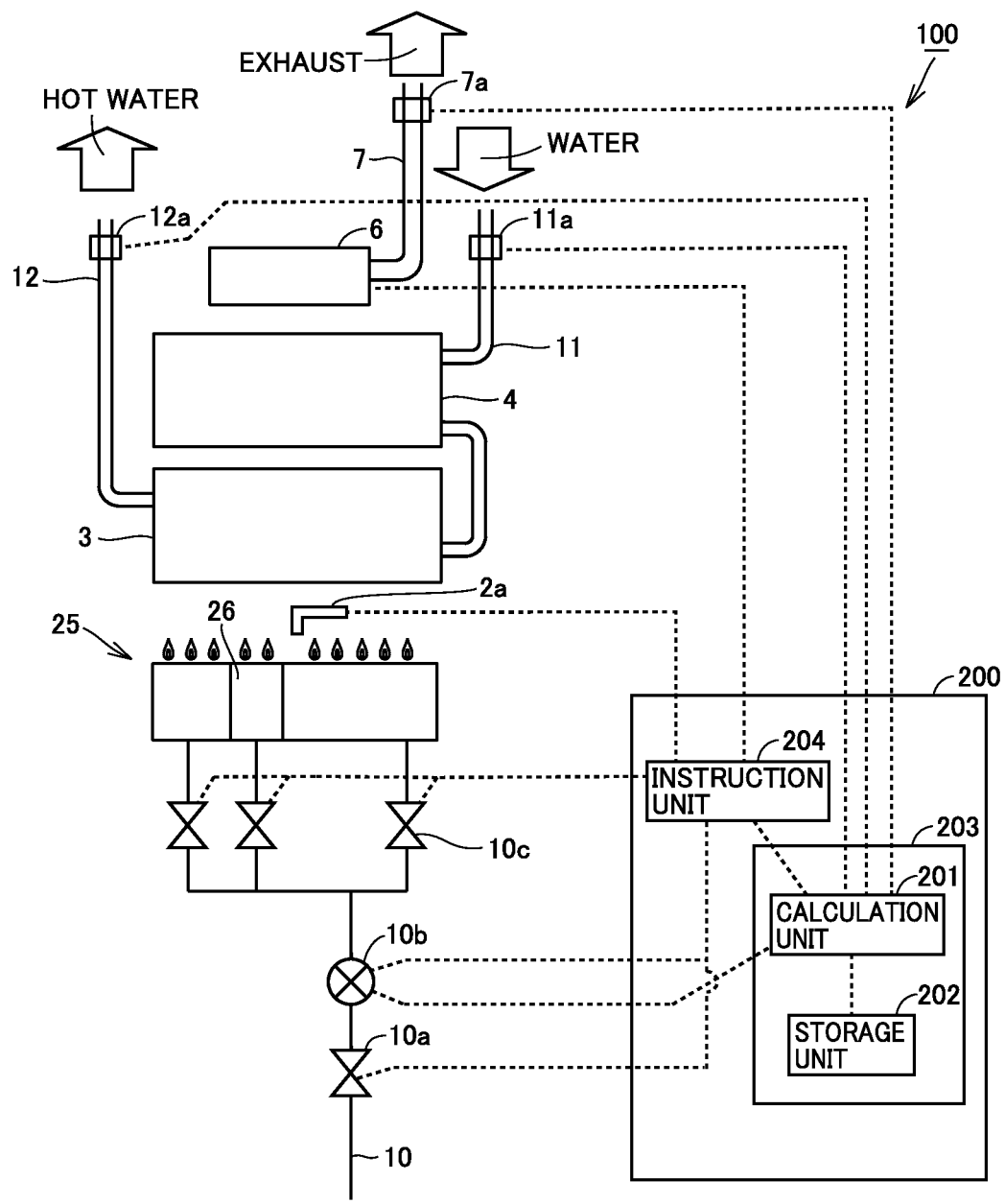
FIG. 8 is a block diagram for illustrating the configuration of a control unit in the first embodiment.

Referring to FIG. 8, water heater 100 of the present embodiment further includes a control unit 200 for controlling flame produced in the combustion region of burner 2. Control unit 200 is formed of a microcomputer and an HIC (Hybrid Integrated Circuit), for example.

Control unit 200 includes a calculation unit 201 connected to a supply water thermistor 11a, a hot water thermistor 12a and a proportional valve 10b, and can sense the water temperature measured by supply water thermistor 11a, the hot water temperature measured by hot water thermistor 12a, and the supply current value to proportional valve 10b. Calculation unit 201 is connected to a storage unit 202 and can store data processed by calculation unit 201, data of the threshold value required for determination about water-sealing (permission determination), and the like. Water-seal determination unit 203 is formed of these calculation unit 201 and storage unit 202.

Control unit 200 has an instruction unit 204 that is connected to fan 6, spark plug 2a, a main electromagnetic valve 10a, a proportional valve 10b, and an electromagnetic valve 10c. Control unit 200 is configured to be capable of controlling the operation of each unit connected to instruction unit 204, the rotation speed of fan 6, the opening degree of proportional valve 10b, and the like according to the instruction from instruction unit 204.

In this way, control unit 200 can increase the rotation speed of fan 6 to blow air for combustion into combustion region 25 (combustion pipe 22) and also can open main electromagnetic valve 10a, proportional valve 10b and electromagnetic valve 10c to supply an air-fuel mixture containing fuel gas to burner 2. Furthermore, control unit 200 can ignite spark plug 2a, thereby allowing the air-fuel mixture to burn to produce a flame at burner 2. Furthermore, control unit 200 is configured to close main electromagnetic valve 10a, proportional valve 10b and electromagnetic valve 10c to stop supplying fuel gas to burner 2, thereby allowing the flame produced at burner 2 to be extinguished.

Main electromagnetic valve 10a can serve to start and stop supplying fuel gas to burner 2, and proportional valve 10b can serve to adjust the supply amount of fuel gas in accordance with the supply current amount. A plurality of electromagnetic valves 10c are connected to unit regions 26, respectively, constituting combustion region 25 within burner case 21. A different number of combustion pipes 22 are housed in each unit region 26. The plurality of electromagnetic valves 10c are independently controlled to be separately opened/closed, so that the number of combustion pipes 22 used for combustion can be adjusted.

Furthermore, water supply pipe 11 has supply water thermistor 11a that measures the temperature of water to be supplied, and hot water delivery pipe 12 has hot water thermistor 12a that measures the temperature of hot water to be discharged. Supply water thermistor 11a and hot water thermistor 12a are connected to calculation unit 201 of control unit 200. Furthermore, proportional valve 10b is also connected to calculation unit 201 that can sense the amount of fuel gas to be supplied to the combustion region based on the current amount supplied to proportional valve 10b.

Water-seal determination unit 203 is configured to: calculate the estimate drainage water discharge amount based on the value measured in each unit connected to calculation unit 201; and based on the condition that the calculated estimate drainage water discharge amount becomes equal to or greater than a prescribed threshold value, determines that the drainage water discharge path is in a water-sealed state, and thus, the water heater can be permitted to operate in the normal mode (permission determination).

Specifically, for example, calculation unit 201 is configured to be capable of: calculating the estimate drainage water discharge amount based on a prescribed calculation table using the temperature of the discharged hot water measured by hot water thermistor 12a, the temperature of the supplied water measured by supply water thermistor 11a and the supply amount of fuel gas sensed by proportional valve 10b; and comparing the calculated estimate drainage water discharge amount and the prescribed threshold value stored in advance in storage unit 202, thereby giving permission based on the condition that the estimate drainage water discharge amount becomes equal to or greater than the prescribed threshold value. This allows water-seal determination unit 203 to automatically make a permission determination. In this case, an explanation has been given with regard to the case where the estimate drainage water discharge amount is calculated using the temperature of discharged hot water, the temperature of supplied water and the supply amount of fuel gas. However, all of the detection values do not necessarily have to be used for calculating the estimate drainage water discharge amount, but at least one of the temperature of discharged hot water, the temperature of supplied water and the supply amount of fuel gas may be used for calculating an approximate estimate drainage water discharge amount.

Furthermore, exhaust tube 7 located downstream of the heat exchanger in the flow direction of combustion gas may have an exhaust temperature detection unit 7a measuring the temperature of the exhaust (combustion gas). Exhaust temperature detection unit 7a is connected to calculation unit 201 of control unit 200. Water-seal determination unit 203 is configured to be capable of calculating the exhaust temperature and the like so as to give permission based on the condition that the exhaust temperature measured in exhaust temperature detection unit 7a reaches a value equal to or greater than a prescribed threshold value stored in advance in storage unit 202, which is defined based on the exhaust temperature (the temperature of combustion gas) calculated based on the prescribed calculation table from the gas supply amount sensed from the proportional valve current, but not to give permission in the case where this exhaust temperature is lower than the prescribed threshold value. This allows water-seal determination unit 203 to automatically make a permission determination. This water-seal determination method using the exhaust temperature employs such a feature as that, in the state where the drainage water discharge path is water-sealed, the temperature of combustion gas is approximately the same as the exhaust temperature calculated based on the prescribed calculation table from the gas supply amount, whereas in the state where the drainage water discharge path is not water-sealed, the outside air that is lower in temperature than combustion gas is introduced into the water heater through the drainage water discharge path, thereby lowering the temperature of combustion gas to be emitted. In place of the method of calculating an exhaust temperature and comparing this calculated exhaust temperature with a threshold value, the temperature change detected in exhaust temperature detection unit 7a is continuously monitored during the water-seal determination mode, and then, the drainage water discharge path may be determined as being water-sealed (permission determination) based on the condition that the detection temperature has abruptly increased at a certain timing.

In the case where the above-described supply water thermistor 11a, hot water thermistor 12a and the like are used for a water-seal determination, exhaust temperature detection unit 7a does not necessarily have to be used for a water-seal determination, and vice versa. As another conceivable approach other than the above, a pressure sensor provided within water heater 100 (inside the flow path of combustion gas) is used to sense the internal pressure of the water heater, and when the internal pressure becomes equal to or less than the prescribed threshold value, water-seal determination unit 203 is caused to give permission.

[Operation of Burner]

Then, the operation of burner 2 in water heater 100 of the present embodiment will be hereinafter described mainly referring to the flowchart shown in FIG. 9 and the timing chart shown in FIG. 10.

In the water heater of the present embodiment, for a time period until water-seal determination unit 203 gives permission that the water heater can operate in the following "normal mode" based on the condition that the drainage water discharge path has been water-sealed, the control unit issues an instruction to operate the water heater in the following "water-seal determination mode" so as to cause the burner to intermittently operate.

In addition, when performing a trial operation of a new water heater or when resuming an operation of a water heater that has not been used for a long period of time, or resuming an operation of a water heater or the like from which drainage water is removed for maintenance or freeze proofing, the operation in the water-seal determination mode may be automatically started based on the time period elapsed since the last use, the pressure within the water heater, the water amount within the drainage water tank, and the like, or a warning may be displayed through a remote controller or the like (not shown) to thereby cause the user to select the start of the operation in the water-seal determination mode.

(Water-Seal Determination Mode)

In the water-seal determination mode, the burner undergoes an intermittent operation. In this case, when the water amount sensor (not shown) disposed in the water supply pipe detects the water amount equal to or greater than the minimum operation water amount, an ON/OFF controller for burner 2 in water heater 100 is set to be ON. The intermittent operation used herein means that the burner repeatedly starts and stops its operation in the state where the ON/OFF controller for the burner is set to be ON (FIG. 10). It is to be noted that the operation of the burner may include not only a combustion operation at the burner but also a series of operations required for the combustion operation, and also may include an operation of the fan repeatedly starting and stopping its operation in cooperation with the operation of the burner.

Figure 9:
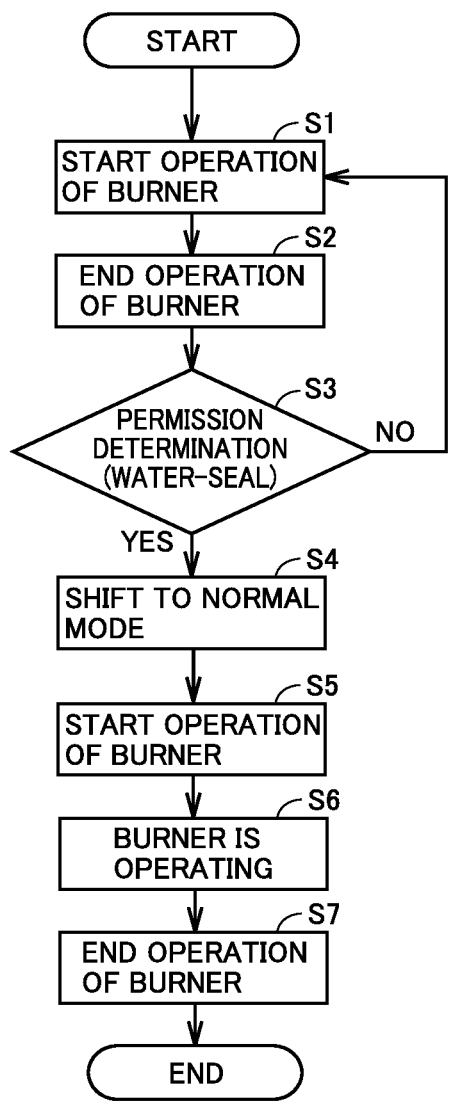
FIG. 9 is a flowchart for illustrating the operation of the burner in the first embodiment.

Referring to FIG. 9, for example, when a hot water tap to be used is opened and the water amount sensor (not shown) provided in the water supply pipe detects the water amount equal to or greater than the minimum operation water amount, the operation of burner 2 is started (step S1).

When starting the operation of burner 2, pre-purge (an operation to start the operation of the fan before ignition to thereby remove residual gas within the combustion chamber) is first carried out for a certain period of time. After that, the main electromagnetic valve is opened, the proportional valve is opened to an opening degree that is required for ignition, and the electromagnetic valves leading to all of the combustion pipes are sequentially opened, to activate an ignition device (igniter) to cause the spark plug to generate ignition sparks, so that each combustion pipe is ignited. In this way, the operation of the burner is started.

During the operation of the burner, the combustion state is maintained at the maximum capability at which the maximum amount of fuel gas is supplied to each combustion pipe in the state where the main electromagnetic valve is opened, the proportional valve is opened to the maximum opening degree, and all of the electromagnetic valves are opened. In this way, since the amount of drainage water to be produced is maximized by maintaining the combustion state at the maximum capability, the drainage water discharge path can be water-sealed promptly. In other words, even in the case where the water-sealed drainage water discharge path is unsealed, a desired hot-water supply capability can be achieved immediately as in the usual case.

Then, after a lapse of a certain time period in the state where the burner is operated (the combustion state), all of the main gas electromagnetic valve, the gas proportional valve and the gas electromagnetic valve (distributing valve) are automatically closed to extinguish flames. Then, post-purge (an operation to remove residual gas within the combustion chamber without stopping the fan after extinction of flame) is carried out for a certain period of time. After that, the fan is stopped and the operation of the burner is ended (step S2).

Then, it is determined in the above-described water-seal determination unit 203 (FIG. 8) whether the water heater can be permitted to operate in the following "normal mode" based on the condition that the drainage water discharge path has been water-sealed (permission determination) (step S3).

When permission is not given in step S3 that the water heater can operate, the process returns to step S1. Then, after a lapse of a certain period of time from the end of operation of the burner, pre-purge is again carried out for a certain period of time. Then, the main gas electromagnetic valve, the gas proportional valve and the gas electromagnetic valve are opened to ignite the combustion pipe. From this point forward until the drainage water discharge path is water-sealed and water-seal determination unit 203 gives permission, the above-described operation is repeated to cause the burner to intermittently operate as shown in the timing chart in FIG. 10.

In addition, in the present embodiment, a certain non-operating time period during which the fan is not operating is provided after the burner is stopped and the fan is stopped in step S2. Thereby, suction of outside air from the drainage water discharge path is stopped during this non-operating time period, with the result that drainage water produced in secondary heat exchanger 4 can be stored in drainage water tank 8 and the like.

On the other hand, in step S3, when the drainage water discharge path is water-sealed and water-seal determination unit 203 gives permission, the operation mode is shifted to the following normal mode (step S4). FIGS. 9 and 10 each show the case where water-seal determination unit 203 gives permission in the state where the burner is not operating, but water-seal determination unit 203 may give permission while the burner is operating. In this case, after giving permission, the operation mode may be shifted to the state where the burner is operating in the normal mode.

(Normal Mode)

When the water amount sensor (not shown) provided in the water supply pipe detects the water amount equal to or greater than the minimum operation water amount, the ON/OFF controller for burner 2 in water heater 100 is set to be ON. In this case, the state where the water heater (burner) operates in the normal mode means that the burner can continuously operate as long as no malfunction occurs in the water heater in the state where the ON/OFF controller for the burner is set to be ON. In other words, the operation of the burner is continued until the ON/OFF controller for the burner is set to be OFF, and the operation of the burner is stopped when the ON/OFF controller for the burner is set to be OFF. The operation of the burner may include not only the combustion operation at the burner, but also a series of operations required for a combustion operation such as an operation of the fan performed in cooperation with the operation of the burner.

Referring to FIG. 9, after the operation mode is shifted to the normal mode in step S4, the operation of burner 2 in water heater 100 is automatically started (step S5) after a lapse of a certain period of time from the end of the operation of the burner in the previous step S2.

Figure 10:
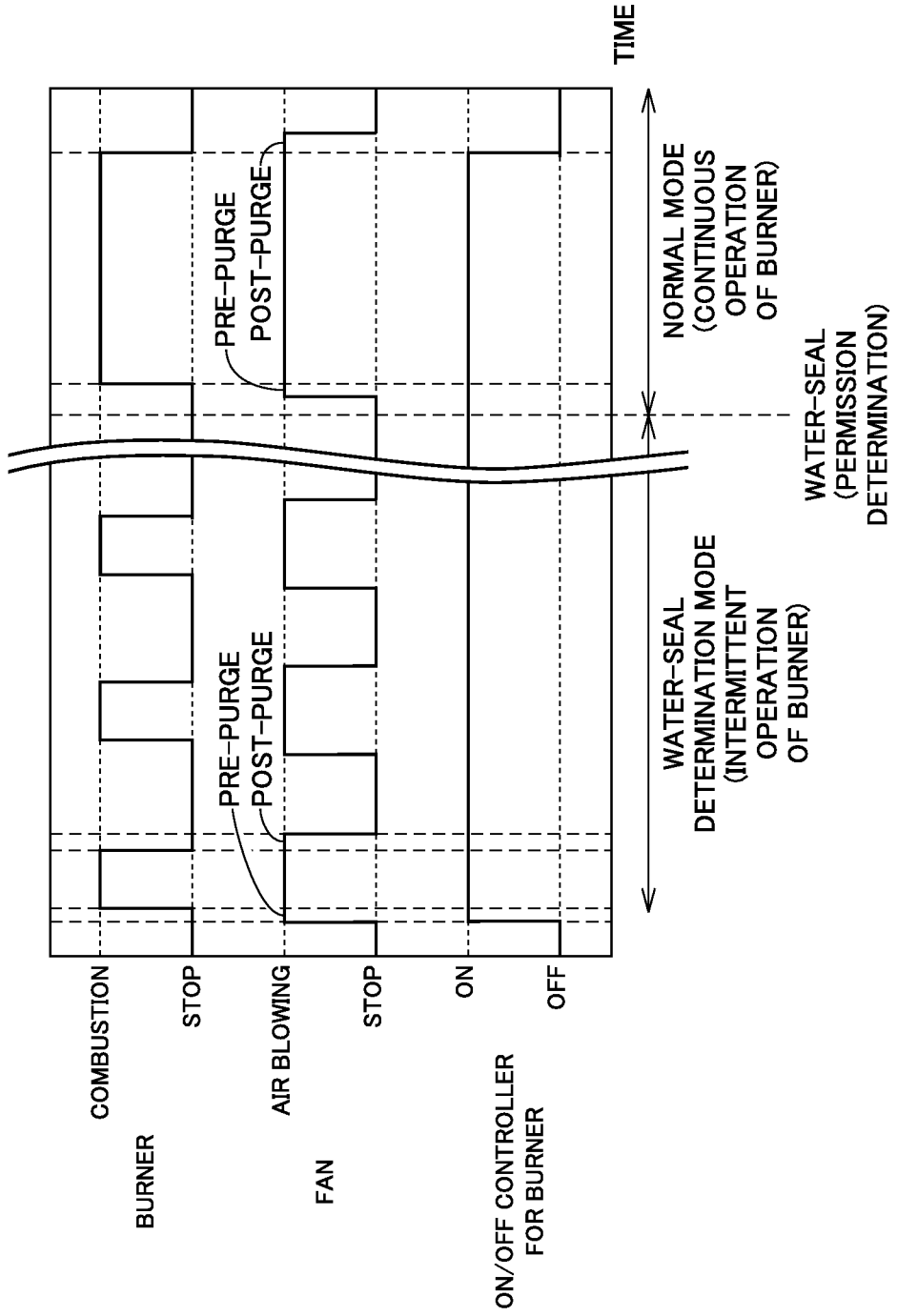
FIG. 10 is a timing chart for illustrating the operation of the burner in the first embodiment.

Referring to FIG. 10, when the operation of burner 2 is started, pre-purge is first carried out for a certain period of time. Then, the main electromagnetic valve, the proportional valve and the electromagnetic valves (at least an electromagnetic valve connected to the unit region provided with spark plug 2a) are opened to operate the ignition device (igniter) to cause spark plug 2a to generate ignition sparks, so that the combustion pipe is ignited.

After the operation of burner 2 is started (during the operation), the number of combustion pipes (the number of stages of the water heater) is adjusted by opening and closing the plurality of electromagnetic valves and the amount of fuel gas to be supplied to each combustion pipe is adjusted by the proportional valve such that the temperature of hot water to be discharged is set at the set temperature while sensing the water temperature at supply water thermistor 11a, sensing the water amount at the water supply amount sensor (not shown), sensing the hot-water temperature at hot water thermistor 12a, and the like (step S6).

Then, for example, when the used hot water tap is closed and the water amount sensor detects that the water amount becomes less than the minimum operation water amount, the ON/OFF controller for burner 2 is set to be OFF to thereby end the operation of burner 2 (step S7). Referring to FIG. 10, when the operation of burner 2 is ended, all of the main gas electromagnetic valve, the gas proportional valve and the gas electromagnetic valve are first closed to extinguish flames. Then, after post-purge is carried out for a certain period of time, the fan is stopped.

<Second Embodiment>

The configuration of the water heater in the second embodiment of the present invention will be hereinafter described with reference to FIGS. 3 to 10. The water heater of the present embodiment is a water heater of a forced exhaust type in which fan 6 is configured to be arranged upstream of the heat exchanger in the flow direction of combustion gas to force air into the burner, and also configured to force air into the water heater thereby emitting combustion gas, which have passed through the heat exchanger, to the outside of the water heater. Thus, fan 6, burner 2, primary heat exchanger 3, and secondary heat exchanger 4 are arranged in this order from upstream to downstream in the flow of combustion gas. The present embodiment is different in the above-described points from the first embodiment, but basically similar in other points to the first embodiment. Accordingly, the same explanation as that of the first embodiment will not be repeated.

In water heater 100 of the first embodiment that is of an exhaust suction type, the water-sealing structure of drainage water tank 8 prevents the outside air from leaking from drainage water tank 8 and flowing into water heater 100. On the other hand, in the present embodiment of a forced exhaust type, particularly in the case where a water heater is arranged inside the building, the water-sealing structure of drainage water tank 8 prevents combustion gas generated within water heater 100 from leaking from drainage water tank 8 and flowing to the outside of water heater 100 (to the inside of the building).

In the present embodiment, burner 2 is caused to intermittently operate as in the first embodiment also for the time period until the drainage water discharge path is water-sealed, so that combustion gas can be prevented from being continuously emitted to the inside of the building.

In addition, in water heater 100 of the present embodiment that is of a forced exhaust type, the outside air is not suctioned from the drainage water discharge path. Accordingly, a certain non-operating time period during which the fan is not operating does not necessarily have to be provided after the burner is stopped and the fan is stopped in the above-described step S2 when the burner operates in the water-seal determination mode. Thus, even if the fan continues operating, the drainage water produced in secondary heat exchanger 4 can be stored in drainage water tank 8 and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater of a latent heat recovery type capable of heating water by recovering latent heat of combustion gas, said water heater comprising:
   a burner generating combustion gas by burning fuel gas in a combustion region;
   a heat exchanger heating water flowing through inside by heat exchange with combustion gas generated in said burner;
   a fan for supplying air to said burner;
   a drainage water discharge path connected to said heat exchanger for discharging drainage water to outside of said heat exchanger, drainage water being dew condensation water produced by recovering latent heat in said heat exchanger, and said drainage water discharge path having a water-sealing structure that is water-sealed by said drainage water;
   a water amount sensor that detects a water amount in a water supply pipe that supplies water to said water heater; and
   a control unit including a water-seal determination unit that determines whether said drainage water discharge path is water-sealed and whether said water heater should operate in a water-seal determination mode or a normal mode, wherein
   an ON/OFF control of said burner is set to be ON when said water amount is equal to or greater than a minimum operation water amount,
   said control unit instructs said water heater to operate in said water-seal determination mode when said water amount is equal to or greater than said minimum operation water amount, said ON/OFF control of said burner is set to be ON, and said drainage water discharge path is determined not to be water-sealed,
said control unit instructs said water heater to operate in said normal mode when said water amount is equal to or greater than said minimum operation water amount, said ON/OFF control of said burner is set to be ON, and said drainage water discharge path is determined to be water-sealed
in said normal mode, said burner continuously operates in the state of ON as long as no malfunction occurs in said water heater, and
in said water-seal determination mode, said control unit instructs said burner and said fan to repeatedly start and stop its operation until said drainage water discharge path changes to be in a state where said drainage water discharge path is water-sealed by said drainage water from a state where said drainage water discharge path is not water-sealed.

2. The water heater according to claim 1, wherein
in said burner, said combustion region is formed of a plurality of unit regions that can be independently controlled such that a generation amount of combustion gas can be changed in accordance with a required hot-water supply capability, and
said control unit issues an instruction to said burner to cause combustion to occur in all of said unit regions for a time period until said water-seal determination unit determines that said drainage water discharge path is water-sealed.

3. The water heater according to claim 1, wherein
said burner is configured to be capable of adjusting a supply amount of fuel gas to said combustion region, and
said control unit issues an instruction to said burner to maximize the supply amount of fuel gas for a time period until said water-seal determination unit determines that said drainage water discharge path is water-sealed.

4. The water heater according to claim 3, wherein
in said burner, said combustion region is formed of a plurality of unit regions that can be independently controlled such that a generation amount of combustion gas can be changed in accordance with a required hot-water supply capability, and
said control unit issues an instruction to said burner to cause combustion to occur in all of said unit regions for a time period until said water-seal determination unit determines that said drainage water discharge path is water-sealed.

5. The water heater according to claim 1, wherein said water-seal determination unit determines that said drainage water discharge path is water-sealed based on a condition that an estimate drainage water discharge amount becomes equal to or greater than a prescribed threshold value, said estimate drainage water discharge amount being calculated using at least one selected from a group consisting of a supply amount of fuel gas to said combustion region, a temperature of water supplied to said water heater, and a temperature of hot water discharged from said water heater.

6. The water heater according to claim 5, wherein
in said burner, said combustion region is formed of a plurality of unit regions that can be independently controlled such that a generation amount of combustion gas can be changed in accordance with a required hot-water supply capability, and
said control unit issues an instruction to said burner to cause combustion to occur in all of said unit regions for a time period until said water-seal determination unit determines that said drainage water discharge path is water-sealed.

7. The water heater according to claim 5, wherein
said burner is configured to be capable of adjusting the supply amount of fuel gas to said combustion region, and
said control unit issues an instruction to said burner to maximize the supply amount of fuel gas for a time period until said water-seal determination unit determines that said drainage water discharge path is water-sealed.

8. The water heater according to claim 6, wherein
said burner is configured to be capable of adjusting the supply amount of fuel gas to said combustion region, and
said control unit issues an instruction to said burner to maximize the supply amount of fuel gas for a time period until said water-seal determination unit determines that said drainage water discharge path is water-sealed.

9. The water heater according to claim 1, wherein
said fan is configured to be arranged downstream of said heat exchanger in a flow direction of combustion gas to suction air into said burner,
said water heater further comprising an exhaust temperature detection unit measuring a temperature of combustion gas and provided downstream of said heat exchanger in the flow direction of combustion gas, and
said water-seal determination unit determines that said drainage water discharge path is water-sealed based on a condition that the temperature of combustion gas measured in said exhaust temperature detection unit tends to increase to a value equal to or greater than a prescribed threshold value.

10. The water heater according to claim 9, wherein
in said burner, said combustion region is formed of a plurality of unit regions that can be independently controlled such that a generation amount of combustion gas can be changed in accordance with a required hot-water supply capability, and
said control unit issues an instruction to said burner to cause combustion to occur in all of said unit regions for a time period until said water-seal determination unit determines that said drainage water discharge path is water-sealed.

11. The water heater according to claim 9, wherein
said burner is configured to be capable of adjusting a supply amount of fuel gas to said combustion region, and
said control unit issues an instruction to said burner to maximize the supply amount of fuel gas for a time period until said water-seal determination unit determines that said drainage water discharge path is water-sealed.

12. The water heater according to claim 10, wherein
said burner is configured to be capable of adjusting a supply amount of fuel gas to said combustion region, and
said control unit issues an instruction to said burner to maximize the supply amount of fuel gas for a time period until said water-seal determination unit determines that said drainage water discharge path is water-sealed.

13. The water heater according to claim 1, wherein said fan is configured to be arranged upstream of said heat exchanger in a flow direction of combustion gas to force air into said burner.

14. The water heater according to claim 13, wherein in said burner, said combustion region is formed of a plurality of unit regions that can be independently controlled such that a generation amount of combustion gas can be changed in accordance with a required hot-water supply capability, and said control unit issues an instruction to said burner to cause combustion to occur in all of said unit regions for a time period until said water-seal determination unit determines that said drainage water discharge path is water-sealed.

15. The water heater according to claim 13, wherein said burner is configured to be capable of adjusting a supply amount of fuel gas to said combustion region, and said control unit issues an instruction to said burner to maximize the supply amount of fuel gas for a time period until said water-seal determination unit determines that said drainage water discharge path is water-sealed.

16. The water heater according to claim 14, wherein said burner is configured to be capable of adjusting the supply amount of fuel gas to said combustion region, and said control unit issues an instruction to said burner to maximize the supply amount of fuel gas for a time period until said water-seal determination unit determines that said drainage water discharge path is water-sealed.

17. The water heater according to claim 13, wherein said water-seal determination unit determines that said drainage water discharge path is water-sealed based on a condition that an estimate drainage water discharge amount becomes equal to or greater than a prescribed threshold value, said estimate drainage water discharge amount being calculated using at least one selected from a group consisting of a supply amount of fuel gas to said combustion region, a temperature of water supplied to said water heater, and a temperature of hot water discharged from said water heater.

18. The water heater according to claim 14, wherein said water-seal determination unit determines that said drainage water discharge path is water-sealed based on a condition that an estimate drainage water discharge amount becomes equal to or greater than a prescribed threshold value, said estimate drainage water discharge amount being calculated using at least one selected from a group consisting of a supply amount of fuel gas to said combustion region, a temperature of water supplied to said water heater, and a temperature of hot water discharged from said water heater.

19. The water heater according to claim 15, wherein said water-seal determination unit determines that said drainage water discharge path is water-sealed based on a condition that an estimate drainage water discharge amount becomes equal to or greater than a prescribed threshold value, said estimate drainage water discharge amount being calculated using at least one selected from a group consisting of a supply amount of fuel gas to said combustion region, a temperature of water supplied to said water heater, and a temperature of hot water discharged from said water heater.

* * * * *